(12) United States Patent
Masuoka

(10) Patent No.: US 8,214,508 B2
(45) Date of Patent: Jul. 3, 2012

(54) SUPPORT APPARATUS, PROGRAM, INFORMATION PROCESSING SYSTEM AND SUPPORT METHOD

(75) Inventor: Yoshimasa Masuoka, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 1401 days.

(21) Appl. No.: 11/682,367

(22) Filed: Mar. 6, 2007

(65) Prior Publication Data

US 2007/0294672 A1 Dec. 20, 2007

(30) Foreign Application Priority Data

Jun. 14, 2006 (JP) ................. 2006-164885

(51) Int. Cl.
*G06F 15/16* (2006.01)
*G06F 15/173* (2006.01)
(52) U.S. Cl. ...................... 709/228; 709/226
(58) Field of Classification Search .................. 709/223, 709/225, 226, 228
See application file for complete search history.

(56) References Cited

U.S. PATENT DOCUMENTS

| 7,565,656 | B2 * | 7/2009 | Yamasaki et al. | 718/104 |
| 7,647,399 | B2 * | 1/2010 | Ofel | 709/224 |
| 2005/0192969 | A1 | 9/2005 | Haga et al. | |
| 2006/0253457 | A1 * | 11/2006 | Takahashi et al. | 707/10 |
| 2007/0192150 | A1 * | 8/2007 | Belkin et al. | 705/7 |

FOREIGN PATENT DOCUMENTS

| JP | 2003-044675 | 2/2003 |
| JP | 2004-252951 | 9/2004 |
| JP | 2005-216151 | 8/2005 |
| JP | 2005-301845 | 10/2005 |

* cited by examiner

*Primary Examiner* — Brian J Gillis
(74) *Attorney, Agent, or Firm* — Antonelli, Terry, Stout & Kraus, LLP.

(57) ABSTRACT

The following solution means are provided for easily specifying property items that have to be revised in order to satisfy a SLO (Service Level Objective): A storage unit (121) for storing an application SLO table that associates a standard SLO item defining a standard SLO with an application SLO item defining a SLO required for executing an application system, and a correspondence table that associates a standard SLO item with a property item having an impact on the standard SLO element. By specifying an application SLO item, a standard SLO item corresponding to that item is extracted from the application SLO table, and a property item corresponding to the extracted standard SLO item is acquired from the correspondence table.

15 Claims, 10 Drawing Sheets

FIG. 2

| STANDARD SLO NUMBER | STANDARD SLO |
|---|---|
| 1 | Availability |
| 2 | Reliability |
| 3 | Throughput |
| 4 | Transaction response times |
| 5 | Report |
| ⋮ | ⋮ |

FIG. 3

| PROPERTY ITEM NUMBER | OBJECT NAME | PROPERTY ITEM NAME |
|---|---|---|
| 1 | APPLICATION SERVER PRODUCT Y | maxThreads |
| 2 | APPLICATION SERVER PRODUCT Y | ClusterMCastFrequency |
| ⋮ | ⋮ | ⋮ |

FIG. 4

| APPLICATION SYSTEM NAME | APPLICATION SLO | STANDARD SLO |
|---|---|---|
| APPLICATION SYSTEM X | AVAILABILITY OF 99.9 % OR MORE | Availability |
| APPLICATION SYSTEM X | FAILURE OCCURRENCE OF 2 OR LESS PER YEAR | Reliability |
| APPLICATION SYSTEM X | CAPABILITY OF PROCESSING A MAXIMUM OF 600 CASES PER SECOND | Throughput |
| APPLICATION SYSTEM X | RESPONSE TIME OF 5 SECONDS OR LESS | Transaction response times |
| ⋮ | ⋮ | ⋮ |

FIG. 5

| PROPERTY ITEM NUMBER | STANDARD SLO | JUDGMENT CONDITION |
|---|---|---|
| 1 | Throughput | (OLD PROPERTY VALUE) > (NEW PROPERTY VALUE) |
| 2 | Availability | (OLD PROPERTY VALUE) > (NEW PROPERTY VALUE) |
| 2 | Reliability | (OLD PROPERTY VALUE) > (NEW PROPERTY VALUE) |
| 2 | Throughput | (OLD PROPERTY VALUE) < (NEW PROPERTY VALUE) |
| 2 | Transaction response times | (OLD PROPERTY VALUE) < (NEW PROPERTY VALUE) |
| ⋮ | ⋮ | ⋮ |

FIG. 6

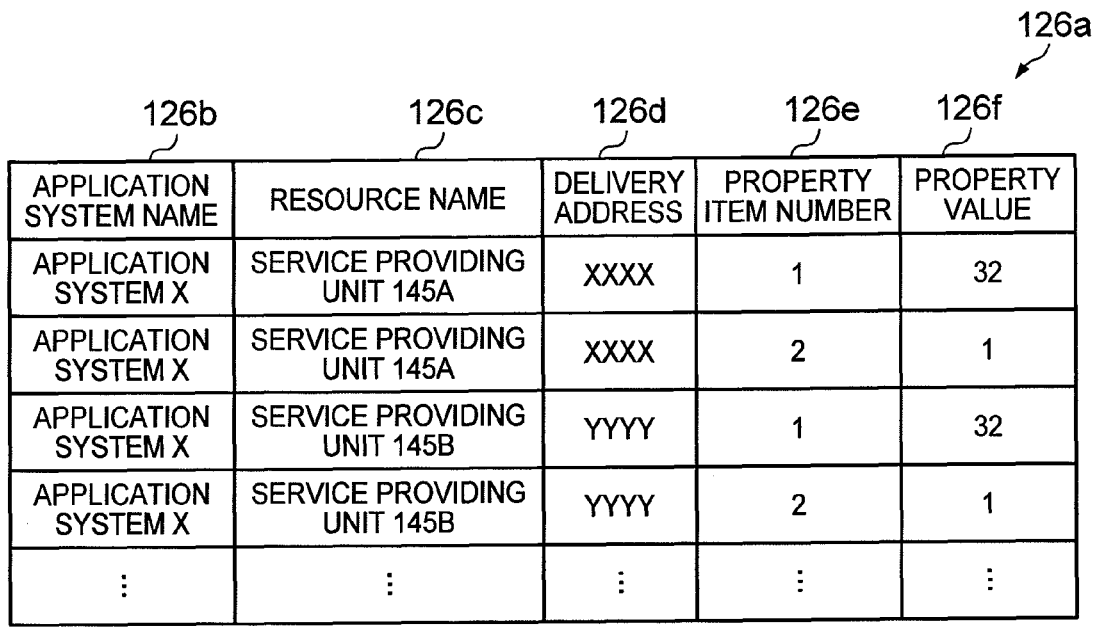

| APPLICATION SYSTEM NAME | RESOURCE NAME | DELIVERY ADDRESS | PROPERTY ITEM NUMBER | PROPERTY VALUE |
|---|---|---|---|---|
| APPLICATION SYSTEM X | SERVICE PROVIDING UNIT 145A | XXXX | 1 | 32 |
| APPLICATION SYSTEM X | SERVICE PROVIDING UNIT 145A | XXXX | 2 | 1 |
| APPLICATION SYSTEM X | SERVICE PROVIDING UNIT 145B | YYYY | 1 | 32 |
| APPLICATION SYSTEM X | SERVICE PROVIDING UNIT 145B | YYYY | 2 | 1 |
| ⋮ | ⋮ | ⋮ | ⋮ | ⋮ |

FIG. 7

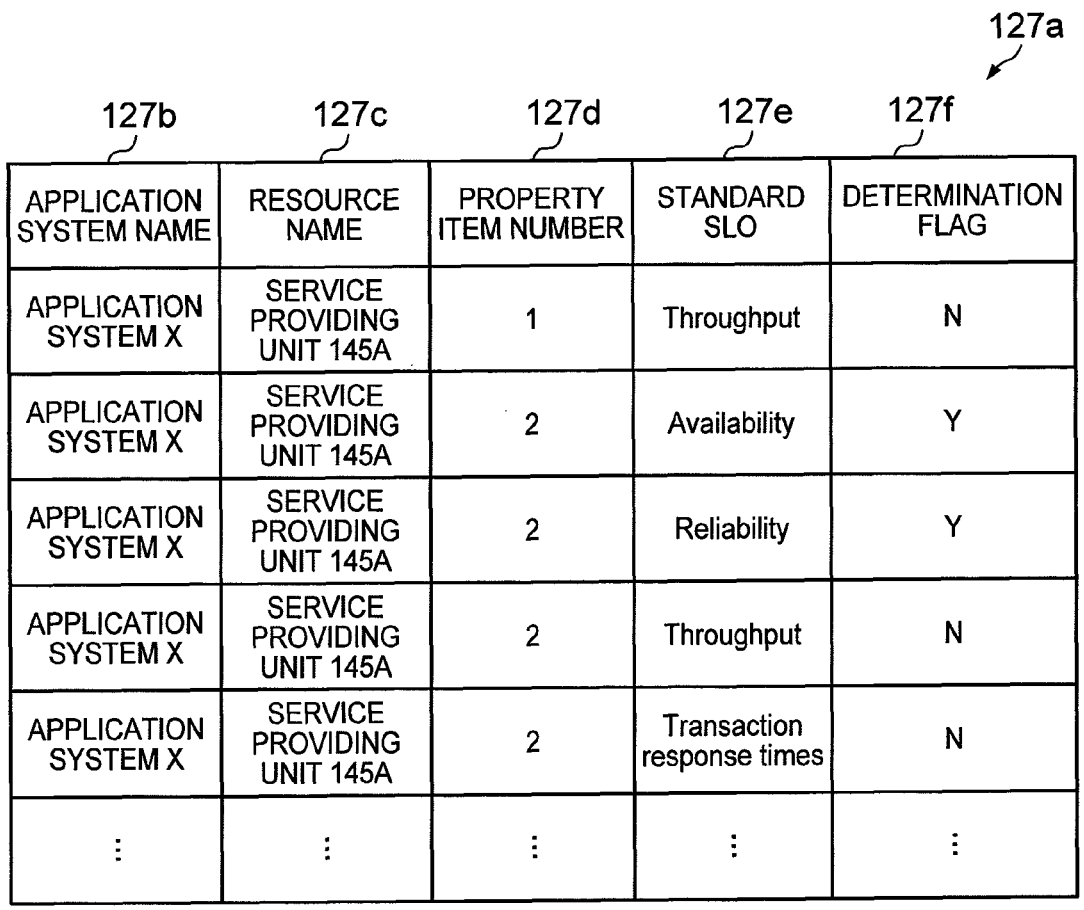

| APPLICATION SYSTEM NAME | RESOURCE NAME | PROPERTY ITEM NUMBER | STANDARD SLO | DETERMINATION FLAG |
|---|---|---|---|---|
| APPLICATION SYSTEM X | SERVICE PROVIDING UNIT 145A | 1 | Throughput | N |
| APPLICATION SYSTEM X | SERVICE PROVIDING UNIT 145A | 2 | Availability | Y |
| APPLICATION SYSTEM X | SERVICE PROVIDING UNIT 145A | 2 | Reliability | Y |
| APPLICATION SYSTEM X | SERVICE PROVIDING UNIT 145A | 2 | Throughput | N |
| APPLICATION SYSTEM X | SERVICE PROVIDING UNIT 145A | 2 | Transaction response times | N |
| ⋮ | ⋮ | ⋮ | ⋮ | ⋮ |

SUPPORT APPARATUS, PROGRAM, INFORMATION PROCESSING SYSTEM AND SUPPORT METHOD

BACKGROUND OF THE INVENTION

1. Field of the Invention

The present invention relates to a technique of supporting determination of property values that are set to property items of an application system.

2. Related Art

In constructing an application system, it is necessary to set suitable property values to property items of resources required for executing the application system.

Recently, there are cases in which a Service Level Agreement (SLA) is made at the time of constructing an application system, and an application system designer determines property values to satisfy Service Level Objectives (SLO), which are components of the SLA.

Patent Document 1 (Japanese Non-examined Patent Application, Laid-Open No. 2004-252951) describes a technique of supporting a designer of an application system. According to the technique described in Patent Document 1, a relation between an application domain and customization items (for example, parts and programs) is registered. When a designer of an application system inputs an application domain of an application system, the customization items corresponding to the inputted application domain are listed.

SUMMARY OF THE INVENTION

Conventional techniques only list customization items such as a part or a program, corresponding to an inputted application domain. Accordingly, a designer of an application system sets property values to the listed customization items and tests whether the settings satisfy all SLOs. Even if only one of the SLOs is not satisfied, the designer must revise all the property values and repeat the test.

An object of the present invention is to provide a technique that can easily specify property items to be revised to satisfy an SLO.

To solve the problem, according to the present invention, correspondence information that associates a standard SLO classification item defining a standard SLO with a property item that has an impact on the standard SLO classification item, is stored in advance for each property item. By inputting application SLO information (namely, information associating each standard SLO classification item with an element of an application SLO, i.e., an SLO required for executing an application system) and information specifying an application SLO element, it is possible to specify property items that may have an impact on the application SLO element in question.

For example, the present invention provides a support apparatus for setting property values to property items of an application system, the support apparatus comprising: a storage unit that stores first information associating, for each of the property items, property item information specifying the property item, and classification item information specifying a first-quality classification item determining a service level to be satisfied by a property value set to the property item; and a control unit; wherein the control unit performs: a process of receiving, through an input unit, input of second information that associates element information specifying a second-quality element determining a service level to be satisfied by the property values set to the property items, and classification item information, for each second-quality element, and storing the received second information into the storage unit; and a process of receiving input of element information specifying the second-quality element through the input unit; acquiring, from the second information, classification item information corresponding to the element information inputted through the input unit; acquiring, from the first information, the property item information corresponding to the classification item information acquired from the second information; and outputting the property item information acquired from the first information, to an output unit.

Thus, according to the present invention, it is possible to specify property items that may have an impact on an application SLO. Accordingly, it is possible to easily specify property items to which suitable property values should be set to satisfy the application SLO.

BRIEF DESCRIPTION OF THE DRAWINGS

FIG. 2 is a schematic diagram showing a standard SLO table 122a;

FIG. 3 is a schematic diagram showing a property item table 123a;

FIG. 4 is a schematic diagram showing an application SLO table 124a;

FIG. 5 is a schematic diagram showing a correspondence table 125a;

FIG. 6 is a schematic diagram showing a configuration information table 126a;

FIG. 7 is a schematic diagram showing a confirmation management table 127a;

FIG. 9 is a schematic diagram showing a log table 143a;

DESCRIPTION OF THE PREFERRED EMBODIMENTS

Figure 1:
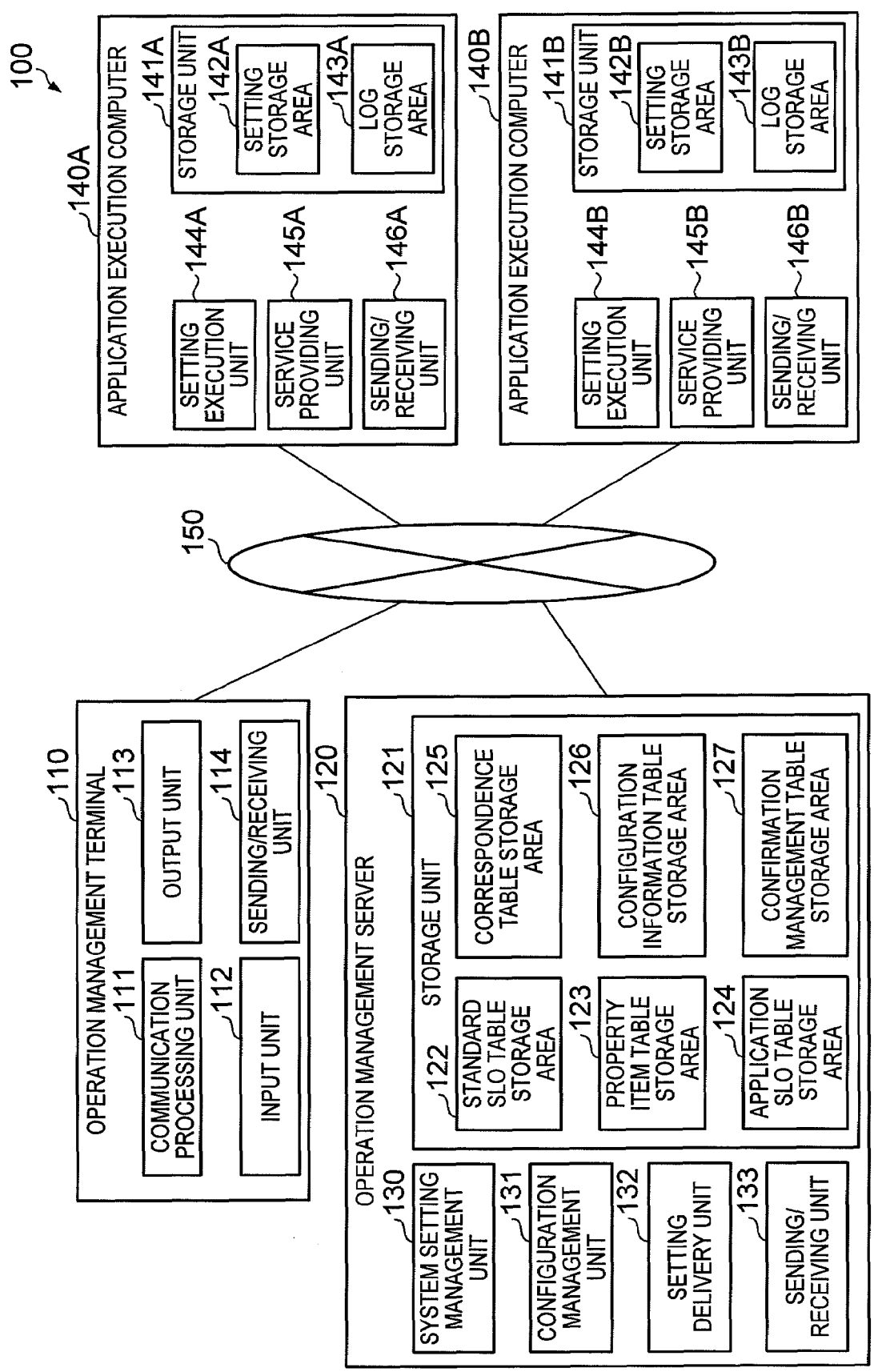
FIG. 1 is a schematic diagram showing an information processing system 100.

FIG. 1 is a schematic diagram showing an information processing system 100 as one embodiment of the present invention.

As shown in the figure, the information processing system 100 comprises an operation management terminal 110, an operation management server 120, and application execution computers 140A and 140B. These apparatuses 110, 120, 140A and 140B are connected through a network 150.

Here, an operator of the information processing system 100 of the present embodiment uses the operation management terminal 110 for designing respective property values of property items of resources required for performing a predetermined application system X on the application execution computers 140A and 140B.

The operation management terminal 110 comprises a communication processing unit 111, an input unit 112, an output unit 113, and a sending/receiving unit 114.

The communication processing unit 111 controls processing of sending information to the operation management server 120 through the below-described sending/receiving unit 114. The information is inputted through the below-described input unit 112.

In the present embodiment, input of predetermined information is received from the operator of the operation management terminal 110 through the below-described input unit 112, so that an item acquisition request message having information specifying an application system name and application SLO, a judgment acquisition request message having information specifying a property value table and application SLO, a setting request message having information specifying a resource name, a property item and a property value, a determination request message having information specifying application SLO elements, and a termination confirmation message having information specifying an application system name are generated and sent to the operation management server 120 through the below-described sending/receiving unit.

Here, the property value table contains at least information specifying property items to which property values are set and information specifying property values that are to be set anew.

Figure 8:
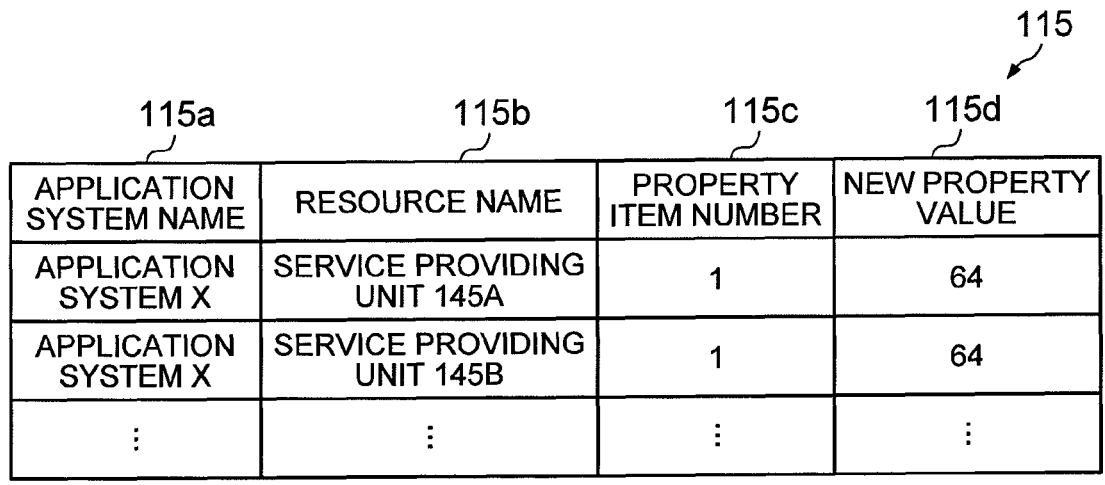
FIG. 8 is a schematic diagram showing a property value table 115.

For example, the property value table 115 as shown in FIG. 8 is sent.

The property value table 115 has an application system name field 115$a$, a resource name field 115$b$, a property item number field 115$c$, and a new property value field 115$d$.

The application system name field 115$a$ registers information that specifies an application system executed on the below-described application execution computers 140A and 140B. In the present embodiment, a name of an application system executed on the below-described application execution computers 140A and 140B is registered in this field.

The resource name field 115$b$ registers information that specifies a resource for which a new property value registered in the below-described new property value field 115$d$ is set. In the present embodiment, a resource name is registered in this field.

The property item number field 115$c$ registers information that specifies a property item for which a new property value registered in the below-described new property value field 115$d$ is set. In the present embodiment, a property item number for specifying the property item is registered in this field.

The new property value field 115$d$ registers a property value that is newly set to the property item specified by the property item number field 115$c$.

The information registered in the property value table 115 is inputted by the operator of the operation management terminal 110 through the input unit 112.

The communication processing unit 111 controls processing of editing information received from the operation management server 120 into a predetermined display format and outputting the edited information to the below-described output unit 113.

The input unit 112 is an input device for receiving input from the operator of the operation management terminal 110.

The output unit 113 is an output device for notifying predetermined information to the operator of the operation management terminal 110.

The sending/receiving unit 114 is a device for sending and receiving information through the network 150.

The operation management terminal 110 having the above-described configuration can be implemented by an ordinary computer. For example, the communication processing unit 111 can be implemented by a Central Processing Unit (CPU), the input unit 112 by an input device such as a mouse or a keyboard, the output unit 113 by a display, and the sending/receiving unit 114 by a Network Interface Card (NIC).

The operation management server 120 comprises a storage unit 121, a system setting management unit 130, a configuration management unit 131, a setting delivery unit 132 and a sending/receiving unit 133.

The storage unit 121 has a standard SLO table storage area 122, a property item table storage area 123, an application SLO table storage area 124, a correspondence table storage area 125, a configuration information table storage area 126, and a confirmation management table storage area 127.

The standard SLO table storage area 122 stores information specifying a standard SLO classification item.

For example, the standard SLO table storage area 122 stores a standard SLO table 122$a$ as shown in FIG. 2 (a schematic diagram showing a standard SLO table 122$a$).

As shown in the figure, the standard SLO table 122$a$ has a standard SLO number field 122$b$ and a standard SLO field 122$c$.

The standard SLO number field 122$b$ stores an identifier for uniquely identifying the standard SLO classification item registered in the below-described standard SLO field 122$c$. Here, it is sufficient that the standard SLO number field 122$b$ stores a number or a character string that can distinguish the row concerned from another row. For example, it is sufficient to assign numbers to rows in order of registration starting from 1, taking the assigned numbers as standard SLO numbers.

The standard SLO field 122$c$ registers a classification item name of a standard SLO. Here, as the SLO classification, the classification defined by Information Technology Infrastructure Library (ITIL) may be employed.

As is clear from the above, the contents of the standard SLO table 122$a$ are simply item names opened in ITIL documents, and thus can be easily generated. Further, the contents of the standard SLO table 122$a$ have no relation to structure of the application system X executed on the application execution computers 140A and 140B. Accordingly, the contents of the standard SLO table 122$a$ can be stored in advance in the standard SLO table area 122. Further, even if another application system is to be executed after setting the application system X, it is not necessary to change the content of the standard SLO table 122$a$.

The property item table storage area 123 stores information on property items relating to programs and apparatuses that require settings in order to execute a certain application system.

For example, the property item table storage area 123 stores a property item table 123$a$ as shown in FIG. 3 (a schematic diagram showing a property item table 123$a$).

As shown in the figure, the property item table 123$a$ has a property item number field 123$b$, an object name field 123$c$, and a property item name field 123$d$.

The property item number field 123$b$ registers an identifier for uniquely identifying the property item registered in the below-described property item name field 123$d$. In the present embodiment, a serial number is registered as an identifier for each row in order to differentiate information in the row from information in another row.

The object name field 123$c$ registers a name of a program, an apparatus, or the like, that requires setting.

In cases where a program, an apparatus, or the like requiring setting is generated exclusively for a certain application system and is not a general-purpose product, then it is sufficient that the operator of the information processing system 100 gives a suitable name to the program, the apparatus, or the like, in question.

The property item name field 123d registers a name of a property item whose setting is performed in the program, the apparatus, or the like, identified in the object name field 123c.

As is clear from the above, one row of the property item table 123a stores only one property item of a product used in the application system. Thus, the property item table 123a can be generated easily. As a method of generating the property item table 123a, the operator of the information processing system 100 may input information on a product, on the basis of a manual attached to the product. Or in cases where equivalent information is incorporated in the below-described service providing units 145A and 145B and the information can be obtained through the network, then the below-described system setting management unit 130 may automatically obtain the information through the network 150, add a row to the property item table 123a, and store the information in that row. The contents of the property item table 123a may be used when setting of an application system other than the application system X.

The application SLO table storage area 124 stores information specifying correspondence between an application SLO element required for each application system and a standard SLO classification item.

For example, the application SLO table storage area 124 stores an application SLO table 124a as shown in FIG. 4 (a schematic diagram showing an application SLO table 124a).

As shown in the figure, the application SLO table 124a has an application system name field 124b, an application SLO field 124c, and a standard SLO field 124d.

The application system name field 124b registers an identifier for identifying an application system executed on the below-described application execution computers 140A and 140B. In the present embodiment, a name of an application system is registered as an identifier.

The application SLO field 124c registers an application SLO element required for executing the application system registered in the application system name field 124b.

The standard SLO field 124d registers a standard SLO classification item name corresponding to the application SLO element registered in the application SLO field 124c. Here, as a standard SLO classification item name registered in this field, one registered in the standard SLO table 122a stored in the standard SLO table storage area 122 is used.

As is clear from the above description, the operator of the information processing system 100 can easily register contents of the application SLO table 124a. That is to say, each row in the application SLO table shows an element of the application SLO determined for executing the application system X, and can be inputted easily. Generally, elements of the application SLO are generated on the basis of the classes of ITIL, for example. As a result, the operator of the information processing system 100 can easily determine a standard SLO classification item corresponding to an application SLO element.

The correspondence table storage area 125 stores information specifying a property item whose setting should be performed for executing each application system, information specifying correspondence between the property item in question and a standard SLO classification item, and information specifying a judgment condition for judging whether change in the property item in question has an adverse impact on the standard SLO classification item.

For example, the correspondence table storage area 125 stores a correspondence table 125a as shown in FIG. 5 (a schematic diagram showing a correspondence table 125a).

As shown in the figure, the correspondence table 125a has a property item number field 125b, a standard SLO field 125c, and a judgment condition field 125d.

The property item number field 125b stores an identifier for uniquely identifying a property item that must be set in order to execute the application system. This field registers a property item number registered in the property item number field 123b of the property item table 123a stored in the property item table storage area 123.

The standard SLO field 125c registers a standard SLO classification item name corresponding to the property item specified in the property item number field 125b. Here, as a standard SLO classification item name registered in this field, a name registered in the standard SLO table 122a stored in the standard SLO table storage area 122 is used.

Here, correspondence between a property item and a standard SLO classification item may be judged according to whether a change in the property item has an impact on the standard SLO.

The judgment condition field 125d registers information specifying what property item change has an adverse impact on the standard SLO classification item.

Here, in the present embodiment, the judgment condition field 125d stores, in the form of a logical expression, what change in the property value can possibly result in non-satisfaction of the standard SLO classification item registered in the standard SLO field 125c. In a logical expression, variables "(old property value)" and "(new property value)" can be used. For example, the expression "(old property value)>(new property value)" written using an inequality sign means that there is a possibility that the standard SLO classification item will not be satisfied when a property value becomes smaller.

As other examples, expressions such as "10<(new property value)" and "MANUAL=(new property value)" may be used in the judgment field 125d. The former expression means that the standard SLO classification item is affected when the property value is larger than 10, and the latter expression means that the standard SLO classification item is affected when the property value is a character string and has a value "MANUAL".

As is clear from the above, the operator of the information processing system 100 can easily generate the correspondence table 125a. That is, the property item table 123a shows which product has which property item, with one row of the table corresponding to one property item of a product. Usually, a manual, written instruction or the like attached to a product describes what impact a value of a property item registered in the property item table 123a has. Thus, the operator of the information processing system 100 can easily generate the correspondence table 125a by referring to the manual or the like of each product.

The configuration information table storage area 126 stores information specifying property items that should be determined for executing an application system, information specifying property values of those property items, and information specifying destinations to which the property values are delivered.

For example, the configuration information table storage area 126 stores a configuration information table 126a as shown in FIG. 6 (a schematic diagram showing a configuration information table 126a).

As shown in the figure, the configuration information table 126a has an application system name field 126b, a resource name field 126c, a delivery address field 126d, a property item number field 126e, and a property value field 126f.

The application system name field 126*b* stores information specifying an application system executed on the application execution computers 140A and 140B. Here, in the present embodiment, this field 126*b* registers a name of an application system executed on the application execution computers 140A and 140B.

The resource name field 126*c* registers information specifying a resource such as a program, a computer, a device, or the like, for which a property value registered in the below-described property value field 126*f* is determined. Here, in the present embodiment, this field 126*c* registers a resource name.

The delivery address field 126*d* stores an address of a computer that has the resource for which the property value registered in the below-described property value field 126*f* is determined. In the present embodiment, this field 126*d* registers an address of either the application execution computer 140A or the application execution computer 140B.

The property item number field 126*e* stores information specifying a property item to which the property value registered in the below-described property value field 126*f* is set. In the present embodiment, this field 126*e* registers a property item number registered in the property item number field 123*b* of the property item table 123*a* stored in the property item table storage area 123.

The property value field 126*f* stores a property value that is set to the property item specified by the property item number field 126*e*.

As the contents of the configuration information table 126*a*, the operator of the information processing system 100 first registers the initial settings at the time of starting setting of the application system X that is executed on the application execution computers 140A and 140B. Thereafter, the operator of the information processing system 100 changes the settings as the occasion may demand.

The confirmation management table storage area 127 stores information specifying whether each property item has been determined to satisfy a standard SLO classification item.

For example, the confirmation management table storage area 127 stores a confirmation management table 127*a* as shown in FIG. 7 (a schematic diagram showing a confirmation management table 127*a*).

As shown in the figure, the confirmation management table 127*a* has an application system name field 127*b*, a resource name field 127*c*, a property item number field 127*d*, a standard SLO field 127*e*, and a determination flag field 127*f*.

The application system name field 127*b* stores information specifying an application system executed on the application execution computers 140A and 140B. Here, in the present embodiment, this field 127*b* stores a name of an application system executed on the application execution computers 140A and 140B.

The resource name field 127*c* registers information specifying a resource a program, a computer, a device or the like that has the property item specified in the below-described property item number field 127*d*. Here, in the present embodiment, this field 127*c* registers a resource name.

The property item number field 127*d* stores information specifying a property item. Determination of a property value set to the property item is shown in the below-described determination flag field 127*f*. In the present embodiment, the property item number field 127*d* registers a property item number registered in the property item number field 123*b* of the property item table 123*a* stored in the property item table storage area 123.

The standard SLO field 127*e* stores information specifying a standard SLO classification item. Determination of satisfaction of the standard SLO classification item is shown in the below-described determination flag field 127*f*. In the present embodiment, the standard SLO field 127*e* registers a standard SLO classification item name.

The determination flag field 127*f* stores information specifying whether it is determined that the property item specified in the property item number field 127*d* satisfies the standard SLO classification item specified in the standard SLO field 127*e*. In the present embodiment, this field 127*f* registers one of "Y", "N" and "L". Here, "Y" indicates that satisfaction of the standard SLO has been determined, "N" that satisfaction of the standard SLO has not been determined yet and should be determined, and "L" that satisfaction of the standard SLO has not been determined yet but the property value will be adjusted after setting the application system X and starting its practical operation. For example, in the case where a mechanism for monitoring the execution performance and for automatically increasing or decreasing the property value on the basis of the monitored result after starting the practical operation of the application system X has been introduced, then "L" is registered with respect to a property item that should be adjusted by that mechanism.

Among rows of the confirmation management table 127*a*, rows for which a column corresponding to the application system name field 127*b* is "application system X" are automatically generated using the correspondence table 125*a* and the configuration information table 126*a* at the time when the operator of the information processing system 100 starts setting of the application system X, and are updated while the operator of the information processing system 100 proceeds with setting of the application system X.

Further, in the confirmation management table 127*a*, contents of the rows for which a column corresponding to the application system name field 127*b* is "application system X" can be generated by extracting all rows for which a column corresponding to the application system name field 126*b* is "application system X" among rows of the configuration information table 126*a*, and then by searching the correspondence table 125*a* to list standard SLO classification items that are affected by respective property items corresponding to the property item numbers in the property item number field 126*e* of the extracted rows (in other words, by executing a so-called join operation in relational databases).

The system setting management unit 130 receives predetermined information from the operation management terminal 110 through the below-described sending/receiving unit 133, so as to control processing in which it receives required information from the storage unit 121 through the below-described configuration management unit 131 and returns the required information to the operation management terminal 110 through the below-described sending/receiving unit 133.

In detail, when the system setting management unit 130 receives a judgment acquisition request message specifying an application system name and an application SLO element from the operation management terminal 110 through the below-described sending/receiving unit 133, then the system setting management unit 130 returns a list of resource names and property items corresponding to the received application system name and application SLO element to the operation management terminal 110 through the below-described sending/receiving unit 133.

Further, when the system setting management unit 130 receives a judgment acquisition request message specifying a property item number, a new property value and an application SLO element from the operation management terminal 110 through the below-described sending/receiving unit 133, then the system setting management unit 130 judges whether input of the received new property value to the property item specified by the received property item number has an adverse impact on the received application SLO element, and returns the judgment result to the operation management terminal 110 through the below-described sending/receiving unit 133.

Further, when the system setting management unit 130 receives a determination request message specifying an application SLO element from the operation management terminal 110 through the below-described sending/receiving unit 133, then the system setting management unit 130 confirms that the property values of the property items corresponding to the received application SLO have not been changed, and registers information "Y" meaning "already determined" in the determination flag field 127*f* corresponding to the unchanged property values in the confirmation management table 127*a*.

Further, when the system setting management unit 130 receives a termination confirmation message specifying an application system name, then the system setting management unit 130 specifies property items that have not been determined yet among the property items corresponding to the received application system name, and returns a list of the specified property items to the operation management terminal 110 through the below-described sending/receiving unit 133.

The configuration management unit 131 manages the tables stored in the storage unit 121. For example, the configuration management unit 131 accesses various kinds of tables stored in the storage unit 121 to acquire required information in response to a request from the system setting management unit 130 or the below-described setting delivery unit 132, and delivers the acquired information to the system setting management unit 130 or the below-described setting delivery unit 132.

The setting delivery unit 132 acquires, through the configuration management unit 131, property value information for executing the application system X, and addresses to which the property value information should be sent, and controls processing of sending the property value information to the application execution computers 140A and 140B through the below-described sending/receiving unit 133 and the network 150.

Here, the property value information sent to the application execution computers 140A and 140B comprises at least information specifying an application system to be executed, information specifying resources for executing the application system, information specifying property items to which property values should be set, and information specifying the property values to be set. For example, the property value information may have a data structure similar to the property value table shown in FIG. 8.

The sending/receiving unit 133 sends and receives information through the network 150.

The above-described operation management server 120 can be implemented by an ordinary computer.

For example, the storage unit 121 can be implemented by an external storage device, such as a hard disk. The system setting management unit 130, the configuration management unit 131 and the setting delivery unit 132 can be realized when a CPU executes predetermined programs stored in the external storage device, such as a hard disk. The sending/receiving unit 133 can be implemented by an NIC.

The application execution computers 140A and 140B each comprise a storage unit 141A, 141B, a setting execution unit 144A, 144B, a service providing unit 145A, 145B, and a sending/receiving unit 146A, 146B.

Each storage unit 141A, 141B comprises a setting storage area 142A, 142B and a log storage area 143A, 143B.

Each setting storage area 142A, 142B stores the property value information sent from the operation management server 120. Here, the property value information comprises at least the information specifying an application system to be executed, the information specifying resources for executing the application system, the information specifying property items to which property values should be set, and the information specifying the property values to be set.

Each log storage area 143A, 143B stores log information on events that have occurred in the application system executed on the service providing unit 145A, 145B.

Contents stored in each log storage area 143A, 143B include information specifying processes performed in the service providing unit 145A, 145B, times when those processes were started, times when those processes were ended, and information specifying whether those processes have been successful or not, in order that response times of the application system executed by the service providing unit 145A, 145B, the number of cases processed per unit of time, availabilities and the like, can be calculated to confirm whether the application SLO has been satisfied.

Figure 9:
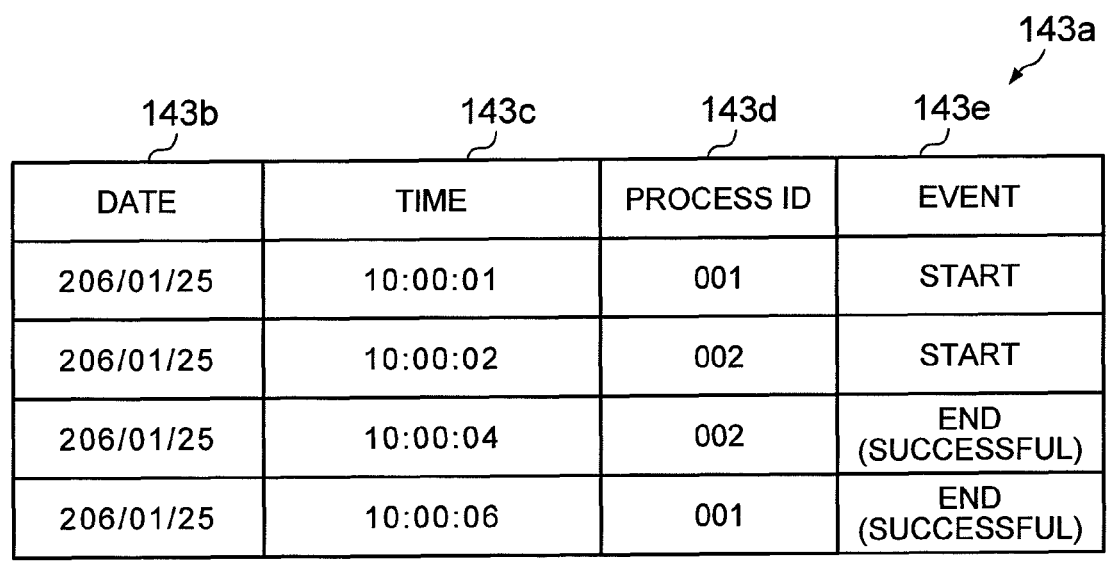

For example, each log storage area 143A, 143B stores a log table 143*a* as shown in FIG. 9 (a schematic diagram showing a log table 143*a*).

As shown in the figure, each log table 143*a* has a date field 143*b*, a time field 143*c*, a process ID field 143*d* and an event field 143*e*.

The date field 143*b* stores a year, a month and a day when a service providing unit 145A, 145B starts a process.

The time field 143*c* stores a time at which the service providing unit 145A, 145B starts the process.

The process ID field 143*d* stores information specifying a process performed in the service providing unit 145A, 145B. In the present embodiment, each process performed in a service providing unit 145A, 145B is associated in advance with an ID, and this field 143*d* registers one of such IDs.

The event field 143*e* stores information specifying a process executed in the service providing unit 145A, 145B and information specifying whether the process in question has been successful or not. In the present embodiment, log information specifying an end of a process registers "End (successful)" when the process was successful, and "End (unsuccessful)" when the process has failed.

Each setting execution unit 144A, 144B receives the property value information from the operation management server 120, and stores the received property value information in the setting storage area 142A, 142B.

Further, each setting execution unit 144A, 144B sets property values to property items of an application system executed on the below-described service providing unit 145A, 145B on the basis of the property value information stored in the setting storage area 142A, 142B. In detail, each setting execution unit 144A, 144B calls system software (for example, an operating system or the like) of the application execution computer 140A, 140B to set values to property items of resources specified by the property value information.

Each service providing unit 145A, 145B performs the processes required for executing the application system X, and stores, as log information, events that occurred in performing the processes, into the log storage area 143A, 143B.

In the present embodiment, the service providing units 145A and 145B can improve availability of the application system when one of the application execution computers 140A and 140B inherits the process of the other in the case of occurrence of a failure in the latter (a so-called fail-over).

However, the service providing units 145A and 145B have property items for controlling a fail-over operation, and a service level cannot be satisfied (for example, the response time of the application system X becomes inferior) unless the operator of the information processing system 100 does not set suitable values to those property items.

Also in cases where the application system X uses other resources (computers, or devices such as network devices and storage devices) and the operation management server 120 sends the property value information to set values to those resources, then those resources can perform the setting for executing the application system X if those resources each have a function corresponding to the function of the setting execution unit 144A, 144B.

Each sending/receiving unit 146A, 146B sends and receives information through the network.

Each of the above-described application execution computers 140A and 140B also can be implemented by an ordinary computer.

For example, each storage unit 141A, 141B can be implemented by an external storage such as a hard disk. Each of the setting execution units 144A and 144B and the service providing unit 145A and 145B can be realized when a CPU executes a predetermined program stored in the external storage device, such as a hard disk. Each sending/receiving unit 146A, 146B can be implemented by an NIC.

In the above description, each component of the information processing system 100 has been described as a software component. However, this does not mean that the present embodiment cannot be executed without software (i.e. programs executed on a computer) being implemented. For example, it does not matter in the present embodiment whether a part or all of the system setting management unit 130, the configuration management unit 131, and the setting delivery unit 132 of the operation management server 120, and the setting execution units 144A and 144B and the service providing units 145A and 145B, of the application execution computers 140A and 140B, are implemented as hardware.

Figure 10:
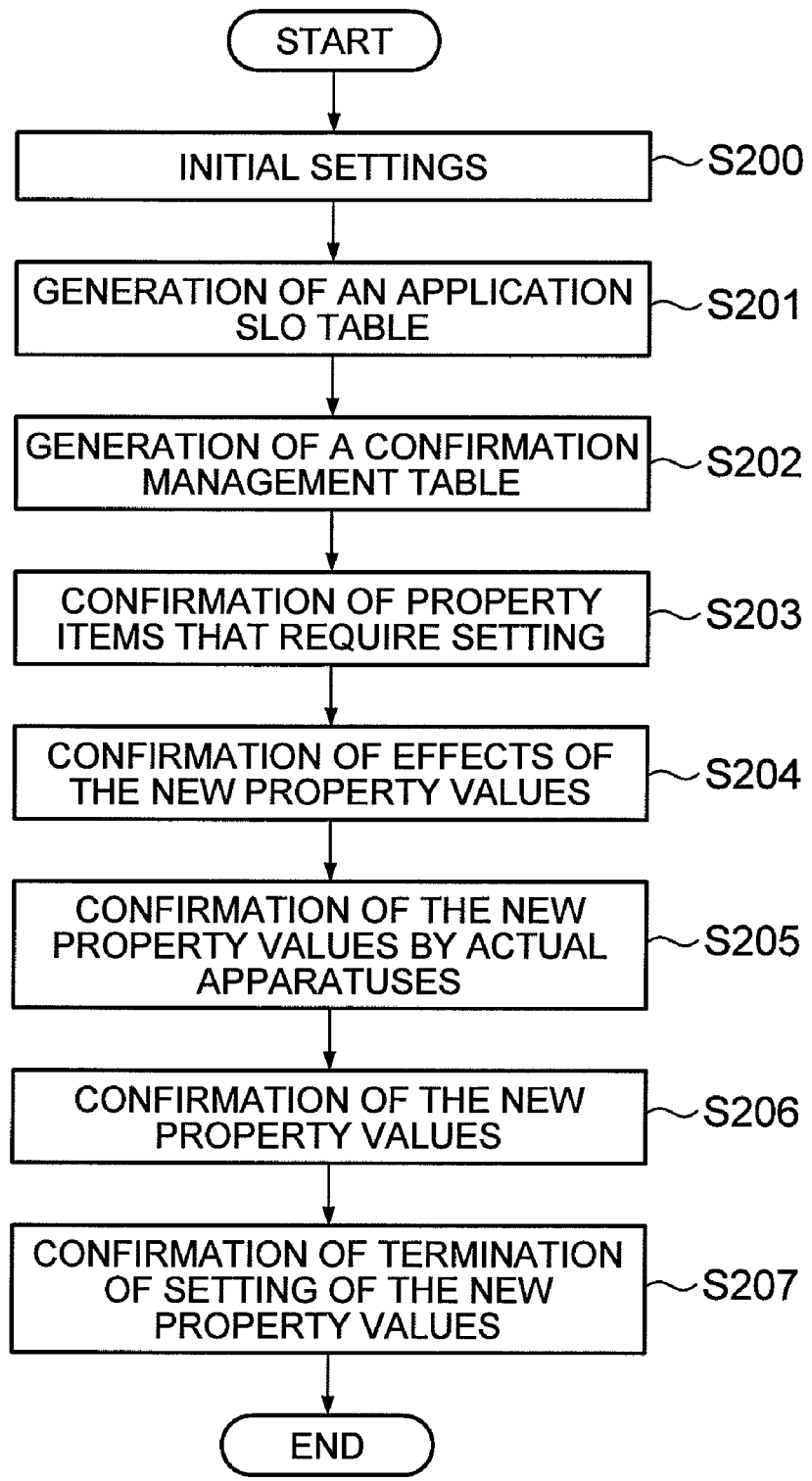
FIG. 10 is a flowchart showing a general procedure for establishing property values set for application execution computers 140A and 140B.

A flowchart in FIG. 10 shows a general procedure for determining property values set to the application execution computers 140A and 140B in the information processing system 100 of the above configuration.

First, the operator of the information processing system 100 performs initial settings (S200).

As the initial settings, the operator of the information processing system 100, for example, calls the configuration management unit 131 of the operation management server 120 through the operation management terminal 11 in order to store the standard SLO table 122a as shown in FIG. 2 into the standard SLO table storage area 122, the property item table 123a as shown in FIG. 3 into the property item table storage area 123, and the correspondence table 125a as shown in FIG. 5 into the correspondence table storage area 125.

Here, information registered in these tables is determined depending on the contents of the standard SLO and specifications of the objects (resources) whose property items are determined for executing the application system, without depending on the contents of the application system. Thus, the information can be registered in advance.

Further, as the initial settings, the operator of the information processing system 100, for example, calls the configuration management unit 131 of the operation management server 120 through the operation management terminal 110 in order to store the configuration information table 126a as shown in FIG. 6 into the storage unit 121 of the operation management server 120.

Here, as information registered in the configuration information table 126a, the operator of the information processing system 100 can input suitable information through the input unit 112. Or, for example, the setting delivery unit 132 of the operation management server 120 may communicate with the application execution computers 140A and 140B and acquire information stored in the setting storage areas 142A and 142B, to generate the configuration information table 126a automatically.

In this step, the application SLO table 124a and the confirmation management table 127a are empty or have no row whose application system name equals "application system X".

Under such initial settings, the operator of the information processing system 100 generates the application SLO table 124a by inputting correspondences between application SLO elements required for executing the application system X and standard SLO classification items through the input unit 112 (S201).

For example, such correspondences can be inputted by displaying an element of the application SLO on the output unit 113 and selecting a standard SLO classification item corresponding to the application SLO from classification item names registered in the standard SLO table 122. Information inputted in this way is sent to the operation management server 120 through the sending/receiving unit 114, and stored into the application SLO table storage area 124 through the configuration management unit 131.

Further, the system setting management unit 130 generates the confirmation management table 127a on the basis of the property item table 123a, the correspondence table 125a and the configuration information table 126a through the configuration management unit 131, and stores the generated confirmation management table 127a into the confirmation management table storage area 127 (S202).

In detail, the system setting management unit 130 acquires a standard SLO classification item corresponding to a property item number in the property item number field 123b of the property item table 123a from the correspondence table 125a, and acquires information of an application system name and a resource name corresponding to a property item number in the property item number field 123b of the property item table 123a from the configuration information table 126a. Then, associating the acquired standard SLO classification item with the information of the application system name and the resource name, the system setting management unit 130 generates the confirmation management table 127a. Here, "N" is registered as a default in the determination flag field 127f.

Then, sending an item request message from the operation management terminal 110 to the operation management server 120, the operator of the information processing system 100 acquires information specifying property items that require setting from the operation management server 120 and confirms the property items (S203). Contents of the processing in the step S203 will be described in detail referring to the below-described flowcharts shown in FIGS. 11 and 12.

Next, by sending the operation management server 120 a judgment acquisition request message specifying property values to be set newly, the operator of the information processing system 100 acquires a judgment result with respect to impact on application SLO elements and thus confirms the impact of new property values (S204). Contents of the processing in step S204 will be described in detail referring to the below-described flowchart shown in FIG. 13.

The operator of the information processing system 100 sends a setting request message specifying new property values from the operation management terminal 110 to the operation management server 120, and sends a new setting request to the application execution computers 140A and 140B through the setting delivery unit 132 of the operation management server 120, in order to confirm further whether the newly-set property values satisfy the application SLO elements (S205).

Here, for example, the setting request message specifies new property values in a tabular form similar to the property value table 115 shown in FIG. 8. The setting delivery unit 132 specifies delivery addresses in the configuration information table 126a on the basis of resource names included in the setting request message, and sends a setting request specifying the application system name, the resource names, and the new property values to the application execution computers 140A and 140B.

On receiving the setting request, each of the application execution computers 140A and 140B stores the received setting request in the setting storage areas 142A and 142B, and executes a setting up process based on the new property values through the setting execution units 144A and 144B.

After the execution of the setting up process, processing is carried out to confirm whether the newly-set values satisfy the application SLO elements (S206). The confirmation processing includes a step of generating test data, a step of requesting processing based on the generated test data, and a step of confirming whether processing results satisfy the application SLO elements. After the execution of the setting up process, the operation management server 120 sends the application SLO elements to be confirmed and the contents of the configuration information table 126a to a test client. Here, although not shown in FIG. 1, the test client is a computer that is connected with the network 150 and can send a message to the application execution computers 140A and 140B.

On receiving the application SLO elements, the application system name and the contents of the configuration information table 126a, the test client refers to the contents of the received configuration information table 126a and extracts information corresponding to the resource name fields of rows each having the application system name field matching the received application system name from the contents of the configuration information table 126a, to acquire the service providing units 145A and 145B.

Next, the test client acquires interface specifications for calling the service providing units 145A and 145B. Here, the interface specifications are described according to a description format conforming to Web Services Description Language (WSD), for example. The format used by the test client for acquiring the interface specifications of the service providing units 145A and 145B may be acquired by sending a fixed request message to the service providing units 145A and 145B. Or, the format may be included in the contents of the call received from the operation management server 120.

Receiving the interface specifications, the test client analyzes the acquired interface specifications to generate test data used in calling the service providing units 145A and 145B.

Next, after generating the test data, the test client sends the generated test data to the service providing units 145A and 145B. For example, in cases where a received application SLO element is "capability of processing a maximum of 600 cases per second", the test client records a sending start time and sends 600 requests per second to the service providing units 145A and 145B.

Next, the test client acquires the log information from the log storage areas 143A and 143B through the respective sending/receiving units 146A and 146B of the application execution computers 140A and 140B. An example of the contents of the log information is shown in the log table 143a of FIG. 9. Receiving the contents of the log information, the test client refers to the contents in order to confirm whether the received application SLO elements are satisfied. If the application SLO elements are satisfied, the test client sends a confirmation request message including the application SLO elements to the system setting management unit 130.

For example, in cases where a received application SLO element is "capability of processing a maximum of 600 cases per second", the test client extracts, out of the log information 143a, all rows for which: the event field 143e is "End (success)", and a time (a time stamp), indicated by the date field 143b and the time field 143c, is later than the previously-recorded sending start time. Further, among the extracted rows, the test client extracts the date field 143b and the time field 143c in the row having the earliest time stamp, and the date field 143b and the time field 143c in the row having the latest time stamp, to calculate a time difference between them. Then, the test client divides the number of the extracted rows by the calculated time difference, and compares the quotient with the number 600 designated in the application SLO element. If the quotient is 600 or more, the test client sends a confirmation request message including the application SLO element to the system setting management unit 130.

A part or all of the processing in the test client can be executed by the operator of the information processing system 100 using the operation management terminal 110.

On receiving the determination request message through the sending/receiving unit 133, the system setting management 130 extracts the application SLO elements from the received determination request message, and acquires the standard SLO classification items corresponding to the extracted application SLO elements, from the application SLO table 124a. For acquiring the standard SLO classification items corresponding to the application SLO elements, the system setting management unit 130 calls the configuration management unit 131 to search the application SLO table 124a.

The system setting management unit 130 calls the configuration management unit 131 to search the confirmation management table 127a in order to acquire all rows corresponding to the thus-obtained standard SLO classification items in the confirmation management table 127a.

Next, the system setting management unit 130 acquires information registered in the resource name field 127c and the property item number field 127d for each of the acquired rows.

The system setting management unit 130 calls the configuration management unit 131 to search the configuration information table 126a in order to acquire rows for which information registered in the application system name field 126b, the resource name field 126c, and the property item number field 126e, coincides with the currently-established application name, a resource name acquired from the confirmation management table 127a, and a property item number acquired from the confirmation management table 127a.

Next, the system setting management unit 130 calls the setting delivery unit 132 to acquire resource property values each corresponding to a resource name and a property item number, acquired from the confirmation management table 127a, from the setting storage areas 142A and 142B in the storage units 141A and 141B of the application execution computers 140A and 140B.

Next, the system setting management unit 130 compares the property values acquired from the setting storage areas 142A and 142B with property values included in the rows acquired from the configuration information table 126a.

Then, the system setting management unit 130 updates the determination flag field 127f of each row satisfying the search conditions in the confirmation management table 127a into "Y", when the comparison result indicates coincidence, or into "L" (which means that the value has been automatically changed during execution of the application system X), when the comparison result indicates non-coincidence. Here, satisfaction of the search conditions means that the resource name field 127c and the property item number field 127d coincide with the previously acquired resource name and property item number.

As described above, using the operation management server 120 of the present invention, the operator of the information processing system 100 can perform management regarding which current application SLO elements a property value or values of one or more property items of one or more resources that compose an application system have been confirmed for, or in other words, as to whether confirmation has been made that the application SLO elements concerned are satisfied. Thus, setting of an application system can be performed efficiently.

Last, the operator of the information processing system 100 confirms termination of setting the property values (S207).

In this confirmation processing, first the operator of the information processing system 100 sends a termination confirmation message specifying the application system name of the application system, whose setting is performed, to the operation management server 120, using the operation management terminal 110.

When the operation management server 120 receives the termination confirmation message, the system setting management unit 130 of the operation management server 120 acquires property item numbers for which the content of the determination flag field 127f corresponding to the received application system name is "N" in the confirmation management table 127a, extracts the property item names corresponding to the acquired property item numbers from the property item table 123a, and returns the extracted property item names to the operation management terminal 110.

The operation management terminal 110 outputs the received property item names as property items that have not been determined yet to the operator through the output unit 113.

By performing the above-described confirmation processing, the operator can easily specify the property items that have not been determined yet, and thus can confirm all property values without omission before starting actual operation of the application system.

Figure 11:
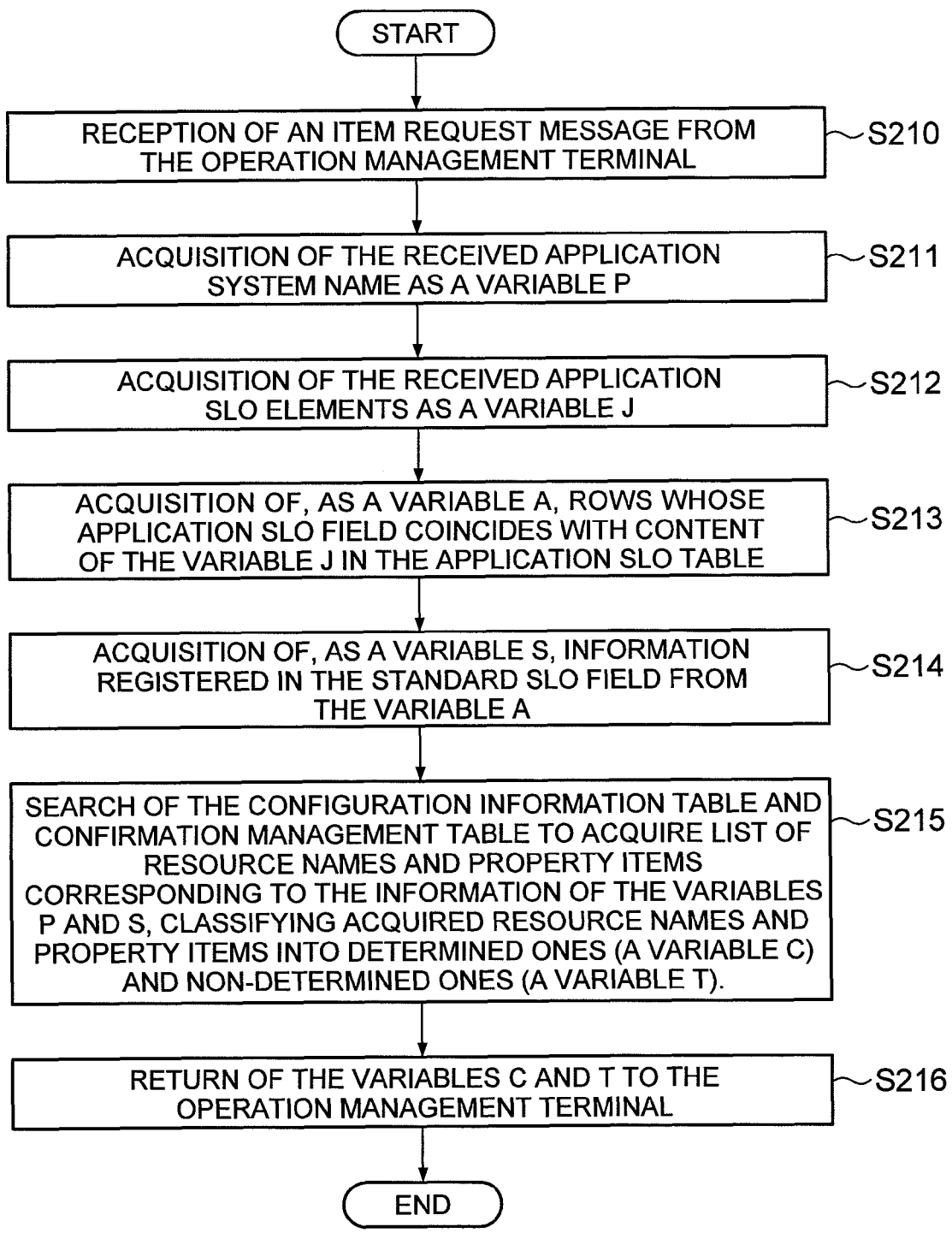
FIG. 11 is a flowchart showing property item confirmation processing.

FIG. 11 is a flowchart showing the processing of confirming the property items.

First, the operation management server 120 receives an item request message specifying the application system name and the application SLO elements from the operation management terminal 110 through the sending/receiving unit 133 (S210).

Then, the system setting management unit 130 of the operation management server 120 extracts the application system name from the received item request message, and acquires the extracted application system name as a variable P (S211).

Further, the system setting management unit 130 extracts the application SLO elements from the received item request message, and acquires the extracted application SLO elements as a variable J (S212).

The system setting management unit 130 calls the configuration management unit 131 to search the application SLO table 124a in order to acquire, as a variable A, rows whose application SLO field 124c coincides with content of the variable J (S213).

The system setting management unit 130 acquires, as a variable S, information registered in the standard SLO field 124d among the contents of the variable A acquired in step S213 (S214).

Then, the system setting management unit 130 calls the configuration management unit 131 to search the configuration information table 126a and the confirmation management table 127a in order to acquire resource names and property items corresponding to the variables P and S. Here, determined resource names and property items are acquired as a variable C, and non-determined ones as a variable T (S215). The processing in this step S215 will be described in detail referring to the flowchart shown in FIG. 12.

Next, the system setting management unit 130 sends the contents of the variables C and T in a predetermined format to the operation management terminal 110 through the sending/receiving unit 133 (S216).

Figure 12:
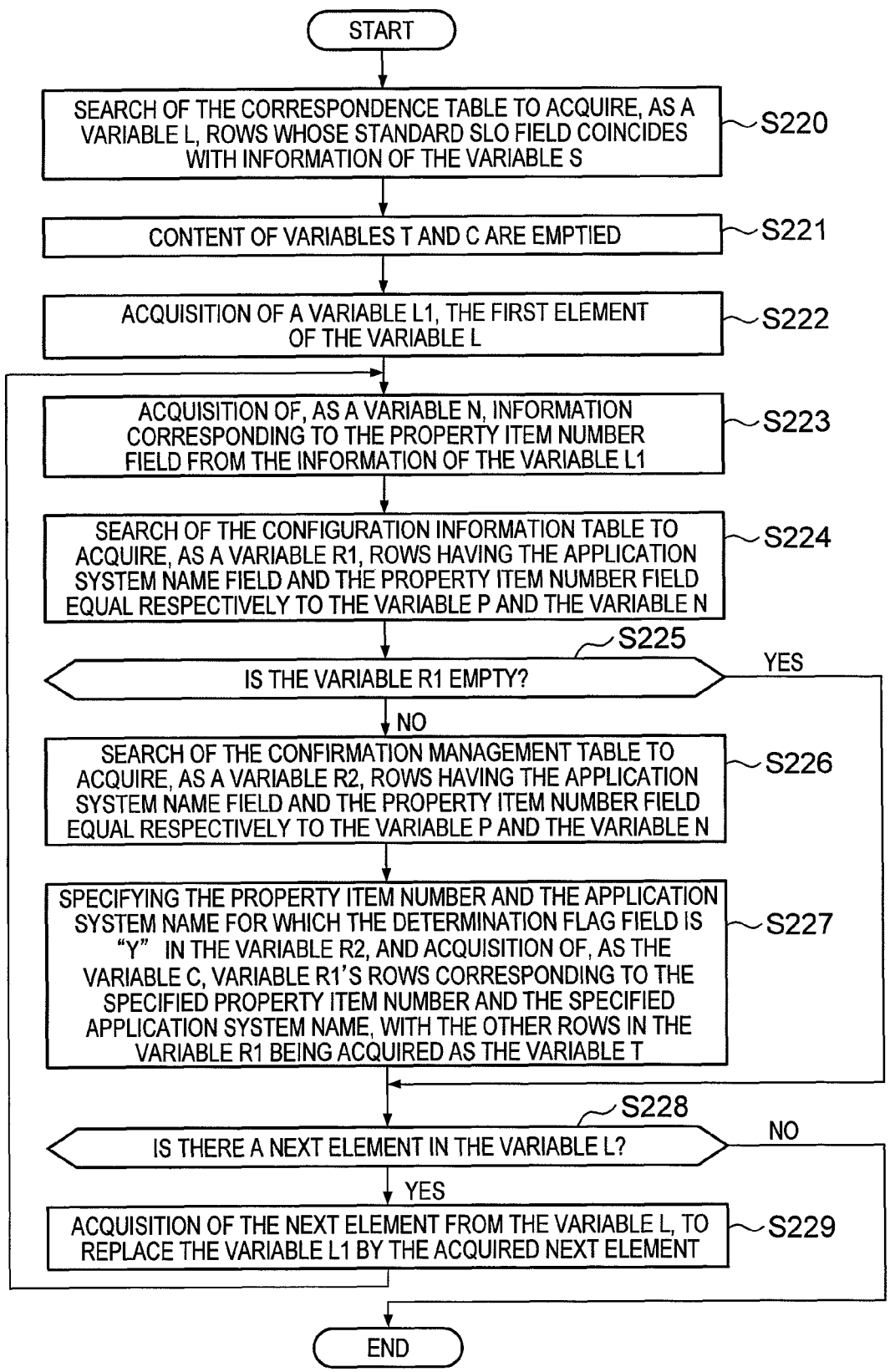
FIG. 12 is a flowchart showing processing of acquiring variables C and T.

FIG. 12 is a flowchart showing the processing of acquiring the variables C and T.

First, the system setting management unit 130 calls the configuration management unit 131 to search the correspondence table 125a in order to acquire, as a variable L, rows whose standard SLO field 125c matches with the information of the variable S (S220).

Next, the system setting management unit 130 empties the contents of the variables T and C (S221).

The system setting management unit 130 acquires, as a variable L1, the first element in the information stored in the variable L (S222).

Further, the system setting management unit 130 acquires, as a variable N, information corresponding to the property item number field 125b in the variable L1 (S223).

Next, the system setting management unit 130 calls the configuration management unit 131 to search the configuration information table 126a in order to acquire, as a variable R1, rows having the application system name field 126b and the property item number field 126e equal to the information of the variable P and the information of the variable N respectively (S224).

Then, in cases where the variable R1 includes information (S225), the system setting management unit 130 calls the configuration management unit 131 to search the confirmation management table 127a in order to acquire, as a variable R2, rows having the application system name field 127b and the property item number field 127d equal to the variable P and the information of the variable N respectively (S226).

Next, the system setting management unit 130 specifies the application system name and the property item number of rows whose determination flag field 127f is "Y", and acquires, as a variable C, variable R1's rows having the application system name 126b and the property item number field 126e that include the specified application system name and the specified property item number respectively and, as a variable T, the other rows in the variable R1 (S227).

Then, the system setting management unit 130 judges whether the variable L includes an element next to the variable L1 (S228). In cases where there the variable L has an element next to the variable L1, then the element next to the variable L1 is acquired from the variable L, and the information of the variable L1 is replaced by the acquired element (S229). Then, the processing from the step S223 through the step S228 is repeated.

In the case where the variable L does not have an element next to the variable L1 (S228), the system setting management unit 130 ends the processing.

As described above, the operator of the information processing system 100 only needs to specify an application system name and application SLO elements, in order to confirm property items relating to the application SLO elements. Thus, the operator of the information processing system 100 can understand without omission which property items of which resources should be adjusted, and which property items of which resources have been once adjusted but may need to be changed according to the case, and require care when carrying out the change. As a result, in general it is possible to adjust efficiently and without omission only necessary property items, among many property items.

Further, with respect to property items other than the property items extracted in this way, the operator of the information processing system 100 can understand that he can input suitable values to application SLO elements that are focused upon.

Figure 13:
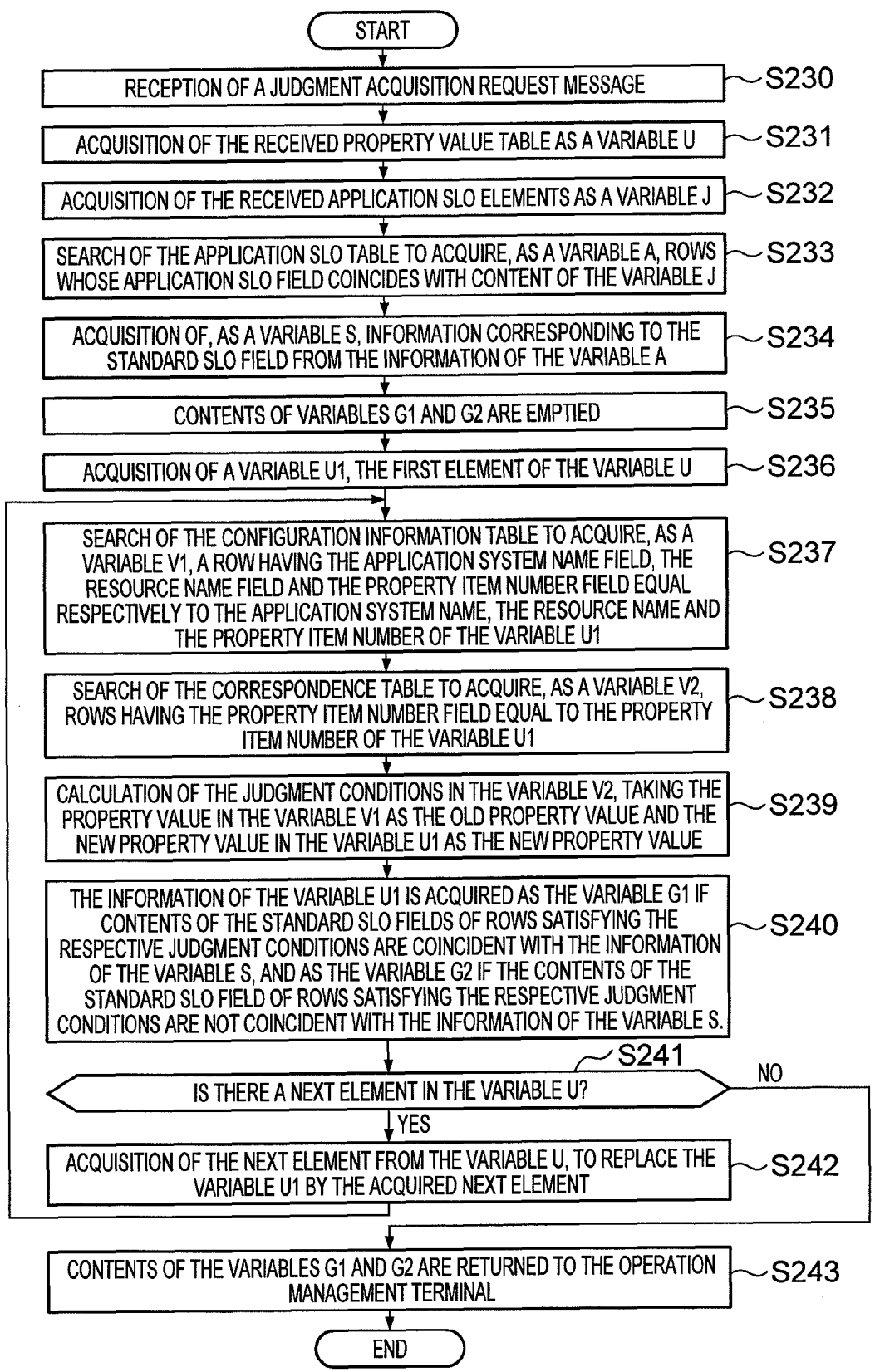
FIG. 13 is a flowchart showing processing of confirming an impact of new property values.

FIG. 13 is a flowchart showing processing of confirming the impact of the new property values.

First, the operation management server 120 receives a judgment acquisition request message specifying application SLO elements and the property value table 115 (See FIG. 8) from the operation management terminal 110 through the sending/receiving unit 133 (S230).

Next, the system setting management unit 130 extracts the property value table 115 from the received judgment acquisition request message and acquires the extracted property value table 115 as a variable U (S231).

Further, the system setting management unit 130 extracts the application SLO elements from the received judgment acquisition request message and acquires the extracted application SLO elements as a variable J (S232).

Next, the system setting management unit 130 calls the configuration management unit 131 to search the application SLO table 124a in order to acquire, as a variable A, rows whose application SLO field 124c coincides with a content of the variable J (S233).

Then, the system setting management unit 130 acquires, as a variable S, information corresponding to the standard SLO field 124d out of the information of the variable A (S234).

Then, the system setting management unit 130 empties contents of variables G1 and G2 (S235).

Next, the system setting management unit 130 acquires, as a variable U1, the first element among the elements of the variable U (S236).

Then, the system setting management unit 130 calls the configuration management unit 131 to search the configuration information table 126a in order to acquire, as a variable V1, a row having the application system name field 126b, the resource name field 126c, and the property item number field 126e equal respectively to the application system name, the resource name, and the property item number of the variable U1 (S237).

Next, the system setting management unit 130 calls the configuration management unit 131 to search the correspondence table 125 in order to acquire, as a variable V2, rows having the property item number field 125b equal to the property item number of the variable U1 (S238).

Then, the system setting management unit 130 judges whether the judgment conditions included in the variable V2 are satisfied or not, taking the property value in the variable V1 as the old property value and the new property value in the variable U1 as the new property value (S239).

With respect to rows satisfying respective judgment conditions, the system setting management unit 130 acquires, as the variable G1, the row of the variable U1 for which the contents of the standard SLO fields 125c, in the rows satisfying the respective judgment conditions, coincide with the information of the variable S, and acquires, as the variable G2, the row of the variable U1 for which the contents of the standard SLO fields 125c, in the rows satisfying the respective judgment conditions, do not coincide with the information of the variable S (S240).

Next, the system setting management unit 130 judges whether the variable U has an element next to the variable U1 (S241). In the case where the variable U has an element next to the variable U1, the element next to the variable U1 is acquired from the variable U, and the variable U1 is replaced by the acquired element (S242). Then, the processing from the step 237 through the step S241 is repeated.

Further, in the case where an element next to the variable U1 does not exist in the variable U (S241), the system setting management unit 130 returns the contents of the acquired variables G1 and G2 to the operation management terminal 110 (S243).

Here, the variable G1 stores, among the rows of the property value table 115, rows for which setting of the new property values stored in these rows may cause non-satisfaction of the very application SLO elements noted by the application system X. For example, in adjusting a property value, focusing on "capability of processing a maximum of 600 cases per second" as an application SLO element, rows of the property value table 115 are stored, in which there is a risk that there will be a reduction in the number of cases that can be processed by the application system X, when a new property value in that row is applied.

On the other hand, the variable G2 stores rows each of which may satisfy the application SLO elements themselves that are focused upon by the application system X, but may not satisfy the other application SLO elements, among the rows of the property value table 115. For example, assuming that a property value is adjusted while focusing on an application SLO element defining "capability of processing a maximum of 600 cases per second", the variable G2 stores rows each of which may cause increase of the number of cases per second that can be processed when the new property value is applied, but on the other hand may cause, for example, decrease of availability so that an application SLO element defining "availability of 99.99% or more" becomes unsatisfied.

As described above, according to the present embodiment, the operator of the information processing system 100 can grasp a property value that may have the opposite effect on an application SLO element that is focused upon or a property value that may cause non-satisfaction of an application SLO element apart from the application SLO element focused upon. As a result, it is possible to reexamine the property values and to input the property values again, thus preventing careless input of a property value that has an adverse impact on the application SLO element itself that is focused upon, or on another application SLO element than the application SLO element focused upon.

In the above-described embodiment, the operation management terminal 110 and the operation management server 120 can communicate with each other through the network 150. However, there is no limitation implied, and the operation management terminal 110 and the operation management server 120 can be connected through a network other than the network 150. Further, it does not matter whether the communication mode of the network 150 is wired or wireless.

Further, in the above-described embodiment, the operation management terminal 110 and the operation management server 120 are described as separate apparatuses. However, there is no limitation implied, and these may be implemented by one apparatus (one computer).

Further, in the above-described embodiment, the application system X is executed on two apparatuses, the application execution computers 140A and 140B. However, there is no limitation implied, and one apparatus may execute the application system X, or another apparatus may be added to execute the application system X.

Figure 14:
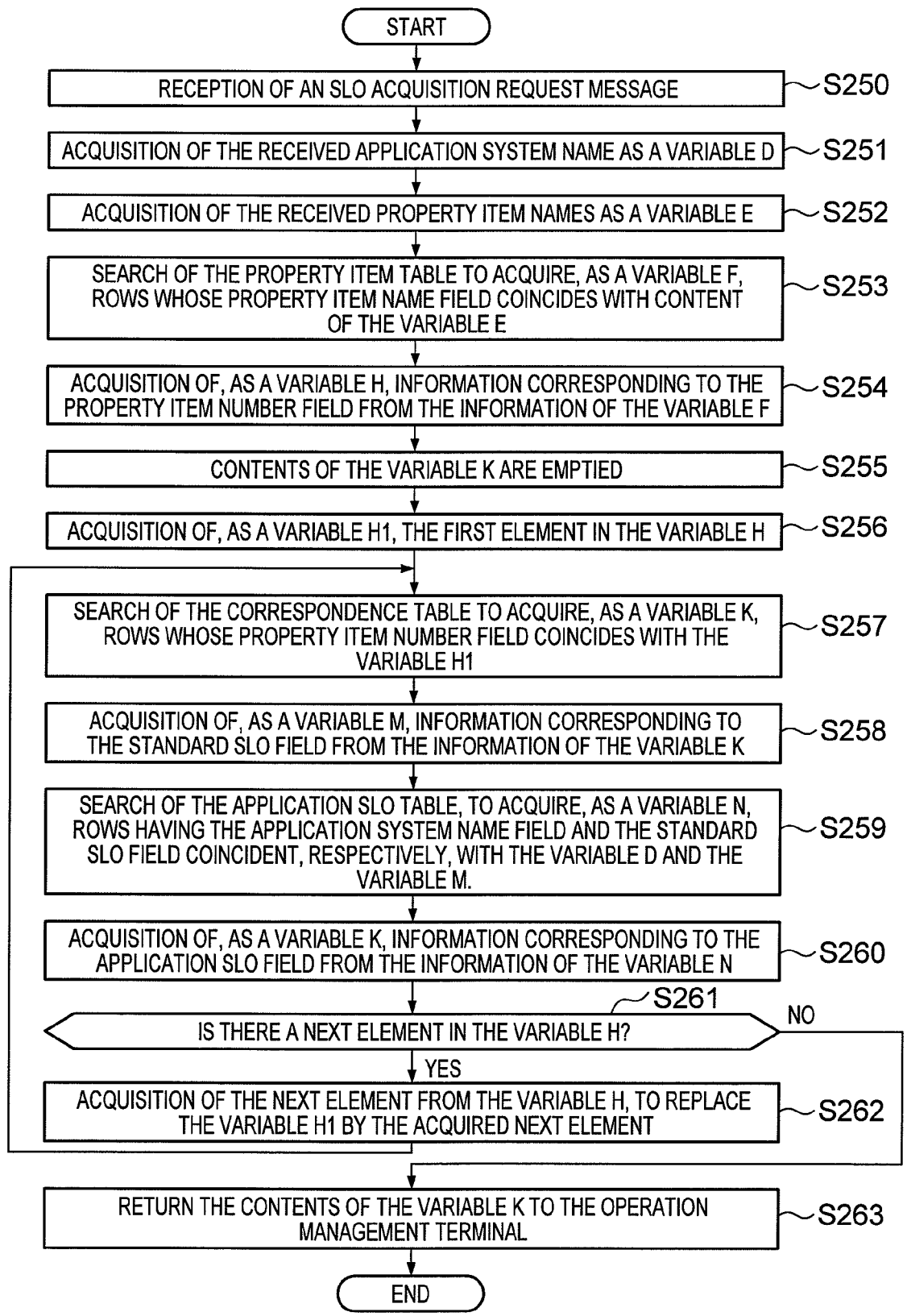
FIG. 14 is a flowchart showing processing of specifying application SLO relating to a specified property item.

Further, in the above-described embodiment, property items that require setting can be acquired from an item acquisition request message specifying an application system name and application SLO elements. However, for example, it is possible that the operation management terminal 110 sends an SLO acquisition request message specifying an application system name and property item names to the operation management server 120, in order to specify application SLOs relating to the specified property items. This processing is shown in the flowchart of FIG. 14.

First, the operation management server 120 receives an SLO acquisition request message specifying an application system name and property item names from the operation management terminal 110 through the sending/receiving unit 133 (S250).

Next, the system setting management unit 130 extracts the application system name from the received SLO acquisition request message, and acquires the extracted application system name as a variable D (S251).

Further, the system setting management unit 130 extracts property item names from the received SLO acquisition request message, and acquires the extracted property item names as a variable E (S252).

Next, the system setting management unit 130 calls the configuration management unit 131 to search the property item table 123a in order to acquire, as a variable F, rows whose property item name field 123d coincides with content of the variable E (S253).

Then, the system setting management unit 130 acquires, as a variable H, information corresponding to the property item number field 123b from the information of the variable F (S254).

The system setting management unit 130 empties the content of a variable K (S255).

Next, the system setting management unit 130 acquires, as a variable H1, the first element in the elements of the variable H (S256).

Then, the system setting management unit 130 calls the configuration management unit 131 to search the correspondence table 125a in order to acquire, as the variable K, rows whose property item number field 125b coincides with the variable H1 (S257).

Next, the system setting management unit 130 acquires, as a variable M, information corresponding to the standard SLO field 125c from the information of the variable K (S258).

Then, the system setting management unit 130 calls the configuration management unit 131 to search the application SLO table 124a in order to acquire, as a variable N, rows having the application system name field 124b matching the variable D and the standard SLO field 124d matching the variable M (S259).

Then, the system setting management unit 130 acquires, as a variable K, information corresponding to the application SLO field 124c from the information of the variable N (S260).

Next, the system setting management unit 130 judges whether the variable H has an element next to the variable H1 (S261). In cases where the variable H has an element next to the variable H1, then the element next to the variable H1 is acquired from the variable H, and the variable H1 is replaced by the acquired element (S262). Then the processing from step S257 through step S261 is repeated.

Further, in cases where the variable H does not have an element next to the variable H1 (S261), then the system setting management unit 130 returns the contents of the acquired variable K to the operation management terminal 110 (S263).

According to the above-described processing, the operator of the information processing system 100 can specify an application SLO that may be affected by the property items set. Thus, it is possible to set the property values considering the contents of the specified application SLO.

The invention claimed is:

1. A computer-implemented support apparatus for setting property values for property items of an application system, the support apparatus comprising:
   a storage unit, including a hard drive, configured to store the following:
      first information that associates, for each of the property items, property item information specifying the property item, and classification item information specifying a first-quality classification item determining a service level to be satisfied by a property value set to the property item, and
      second information that associates a property item information, a judgment condition for judging whether or not a change in a property value affects a first-quality classification item, and classification item information specifying the first-quality classification item potentially affected by the change in the property value; and
   a control unit, including a processor, configured to perform the following:
      receiving, through an input unit, input of third information that associates element information specifying a second-quality element determining a service level to be satisfied by the property values set to the property items, and classification item information, for each second-quality element, and storing the received third information into the storage unit,
      receiving, through the input unit, input of element information specifying the second-quality element,
      receiving, through the input unit, input of property item information specifying a property item, and information specifying a property value set to the property item,
      acquiring, from the second information, the judgment condition corresponding to the property item information inputted through the input unit, and judging whether or not the property value inputted through the input unit affects the first-quality classification item, using the judgment condition,
      acquiring, from the third information, classification item information corresponding to the element information inputted through the input unit,
      acquiring, from the first information, the property item information corresponding to the classification item information acquired from the third information,
      outputting the property item information acquired from the first information, to an output unit,
      conducting a performance testing after an arbitrary property item is changed to a new property value, judging whether or not an application system satisfies an application Service Level Objective (SLO) based on a result of the performance testing, judging whether or not a previous property value stored in configuration information is unintentionally rewritten, when the application system satisfies the SLO, and displaying whether or not the application system satisfies the application SLO.

2. A computer-implemented support apparatus of claim 1, wherein the control unit is further configured to perform the following processes:

receiving, through the input unit, input of the property item information specifying a property item;

acquiring, from the first information, the classification item information corresponding to the property item inputted through the input unit;

acquiring, from the third information, the element information corresponding to the classification item information acquired from the first information; and outputting the element information acquired from the third information, to the output unit.

3. A computer-implemented support apparatus of claim 1, wherein the control unit is further configured to:

receive, through the input unit, input of element information specifying a second-quality element;

acquire, from the third information, the classification item information corresponding to the element information inputted through the input unit, when it is judged from the judgment condition that the property value inputted through the input unit potentially affects the first-quality classification item; and compare the classification item information acquired from the third information and the classification item information specifying the first-quality classification item that is judged to be possibly affected by the property value inputted through the input unit, and outputs the judgment results to the output unit, classifying the judgment results into judgment results for which the comparison shows coincidence and judgment results for which the comparison shows non-coincidence.

4. A computer-implemented support apparatus of claim 1, the storage unit further configured to:

store a fourth information that associates property item information specifying a property item, and property value information specifying a property value set to the property item;

wherein the judgment condition is configured to compare property value information of the fourth information corresponding to property item information inputted through the input unit, and property item information inputted through the input unit.

5. A computer-implemented support apparatus of claim 1, wherein:

the first quality is a quality determined not by processing performed in the application system; and the third quality is a quality determined by processing performed in the application system.

6. A computer-implemented support apparatus of claim 1, further comprising:

a sending/receiving unit configured to send and receive information through a network;

wherein the input unit and the output unit are provided to a terminal connected through the network; and wherein input from the input unit is received through the sending/receiving unit and information is outputted to the output unit through the sending/receiving unit.

7. A non-transitory computer-readable medium, including a program, that when executed in a computer, makes the computer function as follows:

a storage means, including a hard drive, for storing:

first information associating, for each property item, property item information specifying the property item, and classification item information specifying a first-quality classification item determining a service level to be satisfied by a property value set to the property item, and second information that associates a property item information, a judgment condition for judging whether or not a change in a property value affects a first-quality classification item, and classification item information specifying the first-quality classification item potentially affected by the change in the property value; and a control means, including a processor, for performing:

receiving, through an input means, input of third information that associates, for each second-quality element, element information specifying a second-quality element determining a service level to be satisfied by the property values set to the property items, and classification item information, and storing the received third information into the storage means, receiving input of element information specifying second-quality element through the input means, and acquiring, from the second information, classification item information corresponding to the element information inputted through the input means, receiving, through the input means, input of property item information specifying a property item, and information specifying a property value set to the property item, acquiring, from the second information, the judgment condition corresponding to the property item information inputted through the input means, and judging whether or not the property value inputted through the input means affects the first-quality classification item, using the judgment condition, acquiring, from the first information, the property item information corresponding to the classification item information acquired from the third information, outputting the property item information acquired from the first information, to an output means, conducting a performance testing after an arbitrary property item is changed to a new property value, judging whether or not an application system satisfies an application Service Level Objective (SLO) based on a result of the performance testing, judging whether or not a previous property value stored in configuration information is unintentionally rewritten, when the application system satisfies the SLO, and displaying whether or not the application system satisfies the application SLO.

8. A non-transitory computer-readable medium, including the program of claim 7, wherein the control means is configured to perform processes of:

receiving input of the property item information specifying a property item through the input means;

acquiring, from the first information, the classification item information corresponding to the property item inputted through the input means;

acquiring, from the third information, the element information corresponding to the classification item information acquired from the first information; and outputting the element information acquired from the third information, to the output means.

9. A non-transitory computer-readable medium, including the program of claim 7, the storage means being further for storing store second information that associates property item information, a judgment condition for judging whether or not a change in a property value affects a first-quality classification item, and classification item information specifying the first-quality classification item potentially affected by the change in the property value; and the control means being further for:

receiving, through the input means, input of property item information specifying a property item and information specifying a property value set to the property item; and acquiring, from the second information, the judgment condition corresponding to the property item information inputted through the input means, and judge whether or not the property value inputted through the input means affects on the first-quality classification item, using the judgment condition.

10. A non-transitory computer-readable medium, including the program of claim 9, the control means being further for:

receiving input of element information specifying a second-quality element, through the input means;

acquiring, from the third information, the classification item information corresponding to the element information inputted through the input means, when it is judged from the judgment condition that the property value inputted through the input means potentially affects the first-quality classification item; and comparing the classification item information acquired from the third information and the classification item information specifying the first-quality classification item that is judged to be possibly affected by the property value inputted through the input means, and outputs the judgment results to the output means, classifying the judgment results into judgment results for which the comparison shows coincidence and judgment results for which the comparison shows non-coincidence.

11. A non-transitory computer-readable medium, including the program of claim 9, the storage means being further for storing fourth information that associates property item information specifying a property item, and property value information specifying a property value set to the property item; and wherein the judgment condition compares property value information of the fourth information corresponding to property item information inputted through the input means, and property item information inputted through the input means.

12. A non-transitory computer-readable medium, including the program of claim 7, wherein:

the first quality is a quality determined not by processing performed in an application system; and the third quality is a quality determined by processing performed in the application system.

13. A computer-implemented information processing system comprising:

a computer terminal; and a support apparatus connected to the terminal through a network the support apparatus including:

a storage unit, including a hard drive, configured to store:

first information associating, for each of the property items, property item information specifying the property item, and classification item information specifying a first-quality classification item determining a service level to be satisfied by a property value set to the property item, and second information that associates a property item information, a judgment condition for judging whether or not a change in a property value affects a first-quality classification item, and classification item information specifying the first-quality classification item potentially affected by the change in the property value; and a control unit, including a processor, configured to perform:

receiving, through an input unit, input of third information that associates element information specifying a second-quality element determining a service level to be satisfied by the property values set to the property items, and classification item information, for each second-quality element, and storing the received third information into the storage unit, receiving input of element information specifying the second-quality element through the input unit of the terminal;

receiving, through the input unit, input of property item information specifying a property item, and information specifying a property value set to the property item, acquiring, from the second information, the judgment condition corresponding to the property item information inputted through the input unit, and judging whether or not the property value inputted through the input unit affects the first-quality classification item, using the judgment condition, acquiring, from the third information, classification item information corresponding to the element information inputted through the input unit, acquiring, from the first information, the property item information corresponding to the classification item information acquired from the third information, outputting the property item information acquired from the first information to an output unit, conducting a performance testing after an arbitrary property item is changed to a new property value, judging whether or not an application system satisfies an application Service Level Objective (SLO) based on a result of the performance testing, judging whether or not a previous property value stored in configuration information is unintentionally rewritten, when the application system satisfies the SLO, and displaying whether or not the application system satisfies the application SLO.

14. A computer-implemented support method carried out by a support apparatus for setting property values to property items of an application system, the support apparatus including:

a storage unit, including a hard drive, configured to store:

first information associating, for each of the property items, property item information specifying the property item, and classification item information specifying a first-quality classification item determining a service level to be satisfied by a property value set to the property item, and second information that associates a property item information, a judgment condition for judging whether or not a change in a property value affects a first-quality classification item, and classification item information specifying the first-quality classification item potentially affected by the change in the property value; and
a control unit, including a processor, configured to implement the computer-implemented support method, wherein the computer-implemented support method comprises:
 a receiving step, in which the control unit receives, through the input unit, input of property item information specifying a property item, and information specifying a property value set to the property item,
 an acquiring step, in which the control unit acquires, from the second information, the judgment condition corresponding to the property item information inputted through the input unit, and judging whether or not the property value inputted through the input unit affects the first-quality classification item, using the judgment condition,
 a storage step, in which the control unit receives, through an input unit, input of third information that associates element information specifying a second-quality element determining a service level to be satisfied by the property values set to the property items, and classification item information, for each second-quality element, and stores the received third information into the storage unit,
 an element information reception step, in which the control unit receives, through the input unit, input of element information specifying the second-quality element,
 a classification item information acquisition step, in which the control unit acquires, from the third information, classification item information corresponding to the element information inputted in the element information reception step,
 a property item information acquisition step, in which the control unit acquires, from the first information, the property item information corresponding to the classification item information acquired in the classification item information acquisition step,
 an output step, in which the control unit outputs the property item information acquired in the property item acquisition step, to an output unit,
 a performance testing step, in which the control unit conducts a performance testing after an arbitrary property item is changed to a new property value,
 a first judging step, in which the control unit judges whether or not an application system satisfies an application Service Level Objective (SLO) based on a result of the performance testing,
 a second judging step, in which the control unit judges whether or not a previous property value stored in configuration information is unintentionally rewritten, when the application system satisfies the SLO, and
 a displaying step, in which the control unit displays whether or not the application system satisfies the application SLO.

15. A computer-implemented support apparatus for setting property values to property items of an application system, the support apparatus comprising:
 a physical storage unit, including a hard drive, configured to store:
  first information that associates, for each of the property items, property item information specifying the property item, and classification item information specifying a first-quality classification item determining a service level to be satisfied by a property value set to the property item, and
  second information that associates a property item information, a judgment condition for judging whether or not a change in a property value affects a first-quality classification item, and classification item information specifying the first-quality classification item potentially affected by the change in the property value; and
 a control unit, including a processor, configured to perform:
  receiving, through the input unit, input of property item information specifying a property item, and information specifying a property value set to the property item,
  acquiring, from the second information, the judgment condition corresponding to the property item information inputted through the input unit, and judges whether or not the property value inputted through the input unit affects the first-quality classification item, using the judgment condition,
  receiving, through an input unit, input of third information that associates element information specifying a second-quality element determining a service level to be satisfied by the property values set to the property items, and classification item information, for each second-quality element, and storing the received third information into the storage unit,
  receiving, through the input unit, input of element information specifying the second-quality element,
  acquiring, from the third information, classification item information corresponding to the element information inputted through the input unit,
  acquiring, from the first information, the property item information corresponding to the classification item information acquired from the third information,
  outputting the property item information acquired from the first information, to an output unit,
  conducting a performance testing after an arbitrary property item is changed to a new property value,
  judging whether or not an application system satisfies an application Service Level Objective (SLO) based on a result of the performance testing,
  judging whether or not a previous property value stored in configuration information is unintentionally rewritten, when the application system satisfies the SLO, and
  displaying whether or not the application system satisfies the application SLO.

* * * * *